United States Patent
Beulich

(10) Patent No.: US 10,632,859 B2
(45) Date of Patent: Apr. 28, 2020

(54) DRIVE SYSTEM, IN PARTICULAR FOR A VEHICLE, AND METHOD FOR HEATING A DRIVE SYSTEM

(71) Applicant: Robert Bosch GmbH, Stuttgart (DE)

(72) Inventor: Klaus Beulich, Weil der Stadt (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/329,346

(22) PCT Filed: Jul. 31, 2017

(86) PCT No.: PCT/EP2017/069279
§ 371 (c)(1),
(2) Date: Feb. 28, 2019

(87) PCT Pub. No.: WO2018/041499
PCT Pub. Date: Mar. 8, 2018

(65) Prior Publication Data
US 2019/0193581 A1 Jun. 27, 2019

(30) Foreign Application Priority Data

Aug. 30, 2016 (DE) .................. 10 2016 216 324

(51) Int. Cl.
*H02P 29/68* (2016.01)
*B60L 50/75* (2019.01)
(Continued)

(52) U.S. Cl.
CPC ................ *B60L 50/75* (2019.02); *B60K 6/26* (2013.01); *B60K 6/28* (2013.01); *B60L 50/51* (2019.02);
(Continued)

(58) Field of Classification Search
CPC ........... H02M 7/5387; H02M 7/53871; H02M 7/5395; H02P 27/08; H02P 29/024;
(Continued)

(56) References Cited

U.S. PATENT DOCUMENTS 5,801,936 A * 9/1998 Mori ...................... H01L 23/04
363/132
6,058,031 A * 5/2000 Lyons ................... H02M 7/487
363/132
(Continued)

FOREIGN PATENT DOCUMENTS

DE 60005836 5/2004
DE 102007026003 12/2008
(Continued)

OTHER PUBLICATIONS

International Search Report for Application No. PCT/EP2017/069279 dated Nov. 27, 2017 (English Translation, 3 pages).
(Continued)

*Primary Examiner* — Thai T Dinh
(74) *Attorney, Agent, or Firm* — Michael Best & Friedrich LLP

(57) ABSTRACT

The invention relates to a drive system, in particular for a vehicle, comprising a fuel cell unit for generating electric energy, a secondary battery for storing electric energy, an electric machine with windings, and an inverter for actuating the electric machine. The inverter is designed as a 3-level inverter and has multiple electronic switches, diodes, a plus pole, a minus pole, and a neutral pole. The fuel cell unit and the secondary battery are connected in series and are connected to the poles of the inverter. The invention also relates to a method for heating a drive system according to the invention, wherein the switches of the inverter are actuated
(Continued)

such that a short-circuit current path is produced between the poles of the inverter to which the fuel cell unit is connected.

9 Claims, 2 Drawing Sheets

(51) Int. Cl.
| | |
|---|---|
| *B60L 50/51* | (2019.01) |
| *B60L 58/40* | (2019.01) |
| *B60L 58/31* | (2019.01) |
| *B60K 6/26* | (2007.10) |
| *B60K 6/28* | (2007.10) |
| *H02M 7/5387* | (2007.01) |
| *H02P 27/08* | (2006.01) |

(52) U.S. Cl.
CPC .............. *B60L 58/31* (2019.02); *B60L 58/40* (2019.02); *H02M 7/53871* (2013.01); *H02P 27/08* (2013.01); *H02P 29/68* (2016.02); *B60L 2210/40* (2013.01); *B60Y 2200/91* (2013.01); *B60Y 2200/92* (2013.01); *B60Y 2400/112* (2013.01); *B60Y 2400/202* (2013.01); *B60Y 2400/604* (2013.01); *B60Y 2400/61* (2013.01); *Y02T 90/34* (2013.01)

(58) Field of Classification Search
CPC .... H02P 29/68; B60L 50/51; B60L 2240/525; B60L 9/18; B60L 2240/36; B60L 58/18; B60L 50/61; B60L 9/04
See application file for complete search history.

(56) References Cited

U.S. PATENT DOCUMENTS

| | | | | |
|---|---|---|---|---|
| 7,088,073 | B2* | 8/2006 | Morishita | H02M 7/487 318/767 |
| 7,667,342 | B2* | 2/2010 | Matsumoto | B60K 6/26 290/400 |
| 8,411,474 | B2* | 4/2013 | Roesner | H02M 7/487 363/56.01 |
| 8,599,585 | B2* | 12/2013 | Yasuoka | H02M 7/487 363/132 |
| 8,848,405 | B2* | 9/2014 | Temesi | H02M 7/483 363/131 |
| 2004/0100149 | A1 | 5/2004 | Lai | |
| 2006/0006832 | A1* | 1/2006 | Kitajima | B60K 6/26 318/800 |
| 2008/0318100 | A1 | 12/2008 | Owejan | |
| 2010/0266913 | A1 | 10/2010 | Limbeck | |
| 2011/0012543 | A1* | 1/2011 | Takizawa | B60L 3/003 318/139 |
| 2014/0247634 | A1 | 9/2014 | Takizawa | |
| 2016/0056732 | A1* | 2/2016 | Jussila | H02M 7/487 363/131 |

FOREIGN PATENT DOCUMENTS

| | | |
|---|---|---|
| DE | 102008029155 | 1/2009 |
| DE | 102012218584 | 4/2014 |
| DE | 102012222343 | 6/2014 |
| DE | 102014203553 | 8/2015 |
| DE | 102014220834 | 4/2016 |
| JP | 2010102992 | 5/2010 |
| JP | 2010119174 | 5/2010 |

OTHER PUBLICATIONS

Gebreel, "Simulation and Implementation of Two-Level and Three-Level Inverters by Matlab and RT-Lab," Ohio State University 2011, 155 pages.

* cited by examiner

DRIVE SYSTEM, IN PARTICULAR FOR A VEHICLE, AND METHOD FOR HEATING A DRIVE SYSTEM

BACKGROUND OF THE INVENTION

The invention relates to a drive system, in particular for a vehicle, comprising a fuel cell unit for generating electrical energy, a secondary battery for storing electrical energy, an electric machine comprising windings and an inverter for actuating the electric machine. The invention furthermore relates to a method for heating a drive system according to the invention.

It will be the case in the future that electronic systems that combine new energy storage technologies with electric drive technology will increasingly be used, in particular, in vehicles, such as hybrid or electric vehicles. To feed three-phase current into an electric machine, a DC voltage from a battery can be converted to a three-phase AC voltage by means of an inverter.

Fuel cells provide one option for generating electrical energy for an electric drive system of a vehicle. In this case, fuel cell vehicles are often also fitted with secondary batteries for storing the electrical energy in order, for example, to provide a temporary power increase for the drive or to make it possible to recuperate braking energy.

DE 10 2012 222 343 A1 discloses a drive system of the generic type for a vehicle. The drive system comprises a fuel cell unit for generating electrical energy, a secondary battery for storing electrical energy, an electric machine and an inverter for actuating the electric machine.

Fuel cells, particularly in automotive uses, can be located during start-up in an environment in which the temperature is low, in particular significantly below freezing. To prevent damage to the fuel cells, it is known to precede normal operation of the fuel cells with a heating phase. In this heating phase, the efficiency of the fuel cell arrangement is usually impaired in order to increase the waste heat production of the fuel cells.

DE 10 2012 218 584 A1 discloses a fuel cell arrangement and a method for heating the fuel cell arrangement. In this case, a connectable electrical resistor is provided between the contacts of the fuel cell arrangement. If said resistor is connected, heat is generated to heat the fuel cell arrangement.

DE 10 2007 026 003 A1 discloses a fuel cell system and a method for cold-starting the fuel cell system. In the case of a cold start of the fuel cell system, electrical loads are connected here and the introduction of reactants is adjusted at the same time.

A method for starting a solid polymer electrolyte fuel cell below the normal operating temperature is known from DE 600 05 836 T2. In this case, the introduction of a reactant during the start time is shortened.

DE 10 2008 029 155 A1 discloses a fuel cell arrangement having flow channels, which has additional means for heating. These means for heating are, for example, an infrared heating apparatus or a heating element.

Inverters for generating a three-phase AC voltage from a DC voltage are known to those skilled in the art. For example, "2014 IEEE, Print ISBN: 978-3-8007-3603-4" and "SIMULATION AND IMPLEMENTATION OF TWO-LEVEL AND THREE-LEVEL INVERTERS BY MATLAB AND RT-LAB, Ohio State University 2011" disclose 3-level inverters, which have a plurality of electronic switches and diodes and a positive pole, a negative pole and a neutral pole.

SUMMARY OF THE INVENTION

A drive system, in particular for a vehicle, is proposed. The drive system comprises a fuel cell unit for generating electrical energy, a secondary battery for storing electrical energy, an electric machine comprising windings and an inverter for actuating the electric machine. The inverter has, in particular, three phase outputs, and the electric machine has three windings. The phase outputs are connected to the windings of the electric machine.

According to the invention, the inverter is formed as a 3-level inverter and has a plurality of electron switches and diodes and a positive pole, a negative pole and a neutral pole. In this case, the fuel cell unit and the secondary battery are interconnected in series and are connected to the poles of the inverter. For example, the fuel cell unit is connected to the negative pole and the neutral pole, and the secondary battery is connected to the neutral pole and the positive pole. As an alternative, the secondary battery is connected to the negative pole and the neutral pole, and the fuel cell unit is connected to the neutral pole and the positive pole.

Advantageously, the fuel cell unit and the secondary battery are connected to the poles of the inverter in such a way that a higher potential is applied to the positive pole than to the neutral pole, and that a lower potential is applied to the negative pole than to the neutral pole. For example, a negative terminal of the fuel cell unit or of the secondary battery is connected to the negative pole, and a positive terminal of the fuel cell unit or of the secondary battery is connected to the neutral pole. The negative terminal of the fuel cell unit or of the secondary battery is likewise connected to the neutral pole, and the positive terminal of the fuel cell unit or of the secondary battery is likewise connected to the positive pole.

A respective freewheeling diode is preferably connected in parallel with the switches of the inverter. Clamping diodes are preferably provided between the switches of the inverter and the neutral pole of the inverter.

A method for heating an electric drive system according to the invention is also proposed. According to the invention, in this case, the switches of the inverter are actuated in such a way that a short-circuit-like current path is produced between the poles of the inverter, to which poles the fuel cell unit is connected. A short-circuit-like current path is thus produced between the positive terminal and the negative terminal of the fuel cell unit. As a result, a comparatively high current flows through the fuel cell unit and through the inverter. As a result, heat is generated, and the drive system, in particular the fuel cell unit, is heated.

In accordance with one advantageous configuration of the invention, the switches of the inverter are actuated in such a way that only diodes and switches of the inverter are located in the short-circuit-like current path.

In accordance with one advantageous development of the invention, the switches of the inverter are actuated here in such a way that the short-circuit-like current path is produced and suppressed periodically. The average current intensity can be controlled by means of pulse-width modulation (PWM).

In accordance with a further advantageous configuration of the invention, the switches of the inverter are actuated in such a way that at least one winding of the electric machine is located in the short-circuit-like current path. The current intensity is limited by the impedance of the winding of the electric machine.

In accordance with one advantageous development of the invention, the switches of the inverter are actuated here in such a way that the short-circuit-like current path is produced and suppressed periodically. The average current intensity can be controlled on the one hand by means of pulse-width modulation (PWM). In addition, an induction voltage is produced when the short-circuit-like current path in the winding of the electric machine is suppressed.

A respective freewheeling diode is particularly preferably connected in parallel with each switch in such a way that the induction voltage, which is produced through suppressing the short-circuit-like current path in the winding of the electric machine, generates a current, which flows to the secondary battery via at least one freewheeling diode. The secondary battery is charged by said current.

A drive system according to the invention and a method according to the invention are advantageously used in a fuel cell vehicle (FCV).

The drive system according to the invention and the method according to the invention permit relatively precise control of the heating phase of the drive system, in particular of the fuel cell unit. In this case, the average current intensity can be set in a targeted manner by means of pulse-width modulation. Also, additional switching elements, for example a load resistor, are not required. All switching elements required to heat the drive system are present in the drive system itself.

BRIEF DESCRIPTION OF THE DRAWINGS

Embodiments of the invention are explained in more detail with reference to the drawings and the following description.

In the drawings.

DETAILED DESCRIPTION

In the following description of the embodiments of the invention, identical or similar elements are denoted by identical reference signs, wherein a repeated description of these elements in individual cases is omitted. The figures only schematically illustrate the subject matter of the invention.

Figure 1:
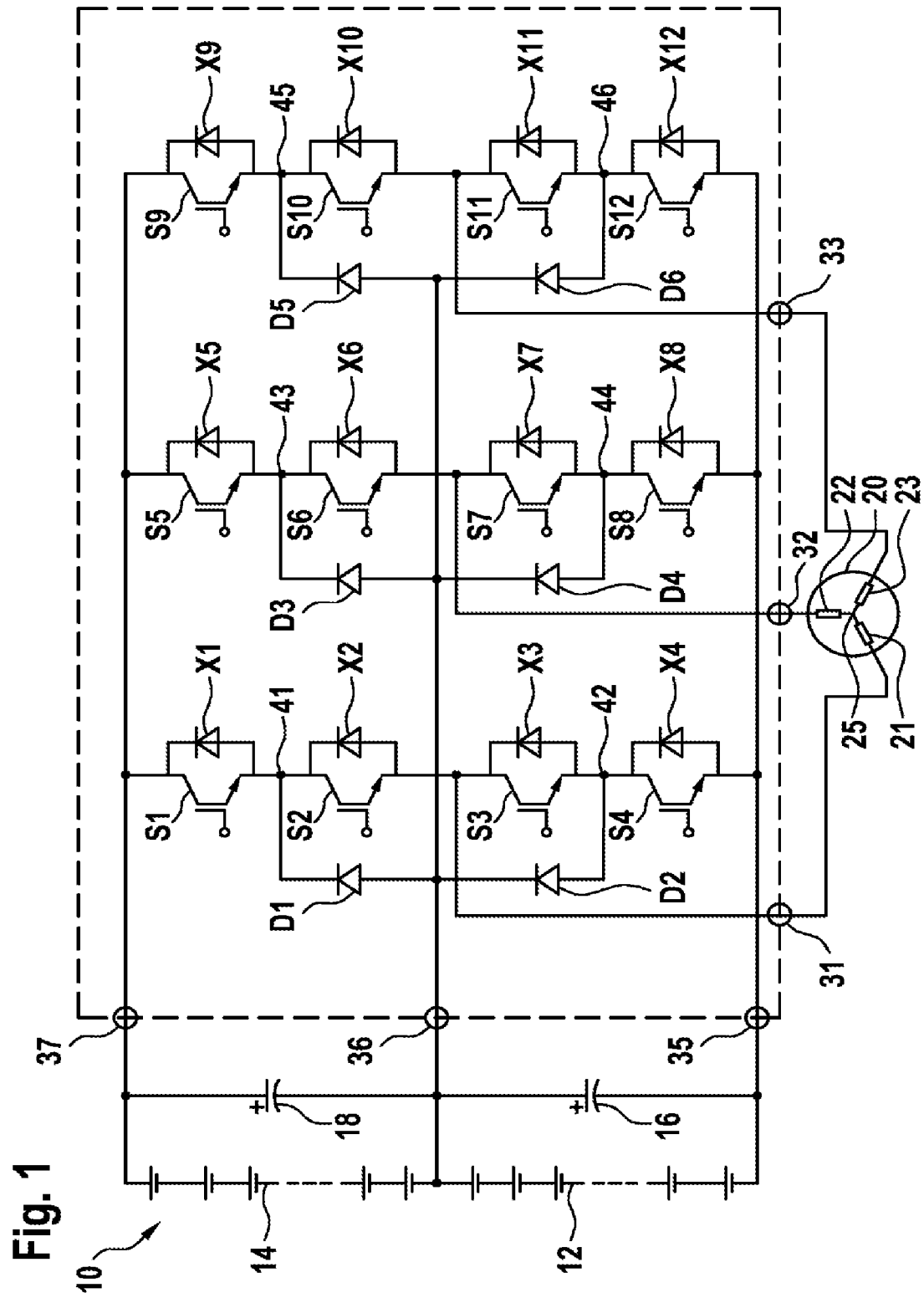
FIG. 1 shows a schematic illustration of a drive system.

FIG. 1 schematically illustrates a drive system 10. The drive system 10 comprises a fuel cell unit 12 for generating electrical energy and a secondary battery 14 for storing electrical energy. The fuel cell unit 12 and the secondary battery 14 each have a plurality of cells interconnected in series. A first capacitor 16 is connected in parallel with the fuel cell unit 12. A second capacitor 18 is connected in parallel with the secondary battery 14.

The drive system 10 furthermore comprises an electric machine 20 comprising a first winding 21, a second winding 22 and a third winding 23. In the present case, the windings 21, 22, 23 are interconnected in a star circuit and connected to a star point 25. The windings 21, 22, 23 could also be interconnected in a delta circuit.

The drive system 10 also comprises an inverter 30 for actuating the electric machine 20. In the present case, the inverter 30 has a first phase output 31, which is connected to the first winding 21, a second phase output 32, which is connected to the second winding 22, and a third phase output 33, which is connected to the third winding 23.

The inverter 30 furthermore has a negative pole 35, a neutral pole 36 and a positive pole 37. In the present case, a negative terminal of the fuel cell unit 12 is connected to the negative pole 35, and a positive terminal of the fuel cell unit 12 is connected to the neutral pole 36. Furthermore, a negative terminal of the secondary battery 14 is connected to the neutral pole 36, and a positive terminal of the secondary battery 14 is connected to the positive pole 37. The fuel cell unit 12 and the secondary battery 14 are therefore also interconnected in series.

A first clamping diode D1 is provided between the neutral pole 36 and a first node 41. A second clamping diode D2 is provided between the neutral pole 36 and a second node 42. A third clamping diode D3 is provided between the neutral pole 36 and a third node 43. A fourth clamping diode D4 is provided between the neutral pole 36 and a fourth node 44. A fifth clamping diode D5 is provided between the neutral pole 36 and a fifth node 45. A sixth clamping diode D6 is provided between the neutral pole 36 and a sixth node 46.

A first switch S1 is arranged between the positive pole 37 and the first node 41. A second switch S2 is arranged between the first phase output 31 and the first node 41. A third switch S3 is arranged between the first phase output 31 and the second node 42. A fourth switch S4 is arranged between the negative pole 35 and the second node 42.

A fifth switch S5 is arranged between the positive pole 37 and the third node 43. A sixth switch S6 is arranged between the second phase output 32 and the third node 43. A seventh switch S7 is arranged between the second phase output 32 and the fourth node 44. An eighth switch S8 is arranged between the negative pole 35 and the fourth node 44.

A ninth switch S9 is arranged between the positive pole 37 and the fifth node 45. A tenth switch S10 is arranged between the third phase output 33 and the fifth node 45. An eleventh switch S11 is arranged between the third phase output 33 and the sixth node 46. A twelfth switch S12 is arranged between the negative pole 35 and the sixth node 46.

The switches S1, S2, S3, S4, S5, S6, S7, S8, S9, S10, S12 of the inverter are electronic switches, which can be actuated by an actuation unit (not illustrated). Said switches S1, S2, S3, S4, S5, S6, S7, S8, S9, S10, S12 are preferably embodied as bipolar transistors or as insulated-gate bipolar transistors (IGBTs).

A first freewheeling diode X1 is connected in parallel with the first switch S1. A second freewheeling diode X2 is connected in parallel with the second switch S2. A third freewheeling diode X3 is connected in parallel with the third switch S3. A fourth freewheeling diode X4 is connected in parallel with the fourth switch S4. A fifth freewheeling diode X5 is connected in parallel with the fifth switch S5. A sixth freewheeling diode X6 is connected in parallel with the sixth switch S6. A seventh freewheeling diode X7 is connected in parallel with the seventh switch S7. An eighth freewheeling diode X8 is connected in parallel with the eighth switch S8. A ninth freewheeling diode X9 is connected in parallel with the ninth switch S9. A tenth freewheeling diode X10 is connected in parallel with the tenth switch S10. An eleventh freewheeling diode X11 is connected in parallel with the eleventh switch S11. A twelfth freewheeling diode X12 is connected in parallel with the twelfth switch S12.

To heat the drive system 10, the second switch S2, the third switch S3 and the fourth switch S4 can be closed, for example. As a result, a short-circuit-like current path is produced from the neutral pole 36 via the first clamping diode D1, the second switch S2, the third switch S3 and the fourth switch S4 to the negative pole 35. In this case, the fuel cell unit 12 supplies a current through the produced short-circuit-like current path.

The second switch S2, the third switch S3 and the fourth switch S4 can in this case be closed and opened periodically, for example at a frequency of 10 kHz, as a result of which the short-circuit-like current path is produced and suppressed periodically. In this case, the average current intensity of the current from the fuel cell unit 12 can be controlled by means of pulse-width modulation (PWM).

A similar short-circuit-like current path is produced when, for example, the sixth switch S6, the seventh switch S7 and the eighth switch S8 are closed. A similar short-circuit-like current path is also produced when the tenth switch S10, the eleventh switch S11 and the twelfth switch S12 are closed.

It is furthermore conceivable for the second switch S2, the third switch S3, the fourth switch S4, the sixth switch S6, the seventh switch S7, the eighth switch S8, the tenth switch S10, the eleventh switch S11 and the twelfth switch S12 to be closed at the same time. As a result, three short-circuit-like current paths running in parallel are produced from the neutral pole 36 to the negative pole 35. The fuel cell unit 12 in this case supplies a current through the produced short-circuit-like current paths.

To heat the drive system 10, the second switch S2, the seventh switch S7 and the eighth switch S8 can also be closed, for example. As a result, a short-circuit-like current path is produced from the neutral pole 36 via the first clamping diode D1, the second switch S2, the first winding 21, the second winding 22, the seventh switch S7 and the eighth switch S8 to the negative pole 35. In this case, the impedances of the first winding 21 and the second winding 22 limit the current intensity of the current that the fuel cell unit 12 supplies through the produced short-circuit-like current path.

Similar short-circuit-like current paths are produced when, for example, the sixth switch S6 or the tenth switch S10 are closed instead of the second switch S2 and when the eleventh switch S11 and the twelfth switch S12 or third switch S3 and the fourth switch S4 are closed instead of the seventh switch S7 and the eighth switch S8. By appropriately selecting the switches that are to be closed, a respective short-circuit-like current path is produced from the neutral pole 36 to the negative pole 35, in which current path two of the windings 21, 22, 23 of the electric machine 20 are located. When the windings 21, 22, 23 are interconnected in a delta circuit, in each case only one of the windings 21, 22, 23 is located in the short-circuit-like current path.

To heat the drive system 10, the second switch S2 can also remain permanently closed, for example, and the seventh switch S7 and the eighth switch S8 are closed and opened periodically. As a result, a short-circuit-like current path is produced periodically from the neutral pole 36 via the first clamping diode D1, the second switch S2, the first winding 21, the second winding 22, the seventh switch S7 and the eighth switch S8 to the negative pole 35, and said current path is suppressed again periodically.

When said short-circuit-like current path is suppressed, an induction voltage is produced in the first winding 21 and in the second winding 22. Said induction voltage generates a current, which flows to the secondary battery 14 via the sixth freewheeling diode X6 and the fifth freewheeling diode X5. The secondary battery 14 is charged by said current.

Instead of the second switch S2, the sixth switch S6 or the tenth switch S10 can also remain closed. By appropriately selecting the switches that are to be closed, a respective short-circuit-like current path is produced from the neutral pole 36 to the negative pole 35, in which current path two of the windings 21, 22, 23 of the electric machine 20 are located.

Instead of the seventh switch S7 and the eighth switch S8, the eleventh switch S11 and the twelfth switch S12 can be opened and closed periodically, for example. In this case, the current generated by the induction voltage flows to the secondary battery 14 via the tenth freewheeling diode X10 and the ninth freewheeling diode X9.

Instead of the seventh switch S7 and the eighth switch S8, the third switch S3 and the fourth switch S4 can also be closed and opened periodically, for example. In this case, the current generated by the induction voltage flows to the secondary battery 14 via the second freewheeling diode X2 and the first freewheeling diode X1.

Figure 2:
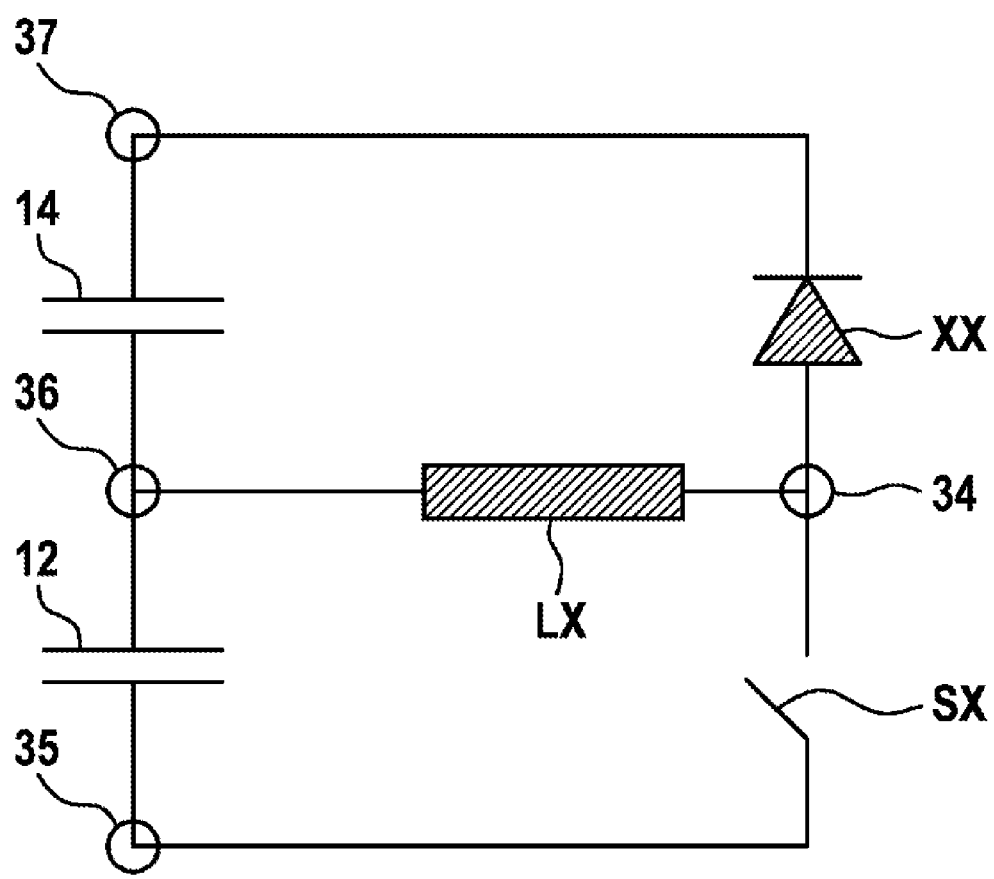
FIG. 2 shows an equivalent circuit of the drive system from FIG. 1 for charging the secondary battery.

A simplified equivalent circuit of the drive system 10 from FIG. 1 for charging the secondary battery 14 is illustrated in FIG. 2. In this case, switching elements, which are not essential for the function of charging the secondary battery 14, are not illustrated. By way of appropriate actuation, the drive system 10 acts like a boost converter or a step-up converter during charging of the secondary battery 14.

As already shown in FIG. 1, the fuel cell unit 12 and the secondary battery 14 are interconnected in series. The negative terminal of the fuel cell unit 12 is connected to the negative pole 35, and the positive terminal of the fuel cell unit 12 is connected to the neutral pole 36. The negative terminal of the secondary battery 14 is connected to the neutral pole 36, and the positive terminal of the secondary battery 14 is connected to the positive pole 37.

An equivalent inductance LX is arranged between the neutral pole 36 and an equivalent phase output 34. Depending on the selected switches, the equivalent inductance LX in this case forms the sum of the inductances of the first winding 21 and the second winding 22, or of the second winding 22 and the third winding 23, or of the third winding 23 and the first winding 21. Depending on the selected switches, the equivalent phase output 34 corresponds to the first phase output 31, the second phase output 32 or the third phase output 33.

An equivalent switch SX is provided between the equivalent phase output 34 and the negative pole 35. Depending on the selected switches, the equivalent switch SX forms the seventh switch S7 and the eighth switch S8, or the eleventh switch S11 and the twelfth switch S12, or the third switch S3 and the fourth switch S4.

An equivalent freewheeling diode XX is provided between the equivalent phase output 34 and the positive pole 37. Depending on the selected switches, the equivalent freewheeling diode XX forms the sixth freewheeling diode X6 and the fifth freewheeling diode X5, or the tenth freewheeling diode X10 and the ninth freewheeling diode X9, or the second freewheeling diode X2 and the first freewheeling diode X1.

The invention is not restricted to the exemplary embodiments described here and the aspects highlighted therein. Rather, within the scope of the claims, numerous modifications within the capabilities of those skilled in the art are possible.

The invention claimed is:

1. A method for heating a drive system, the method comprising:
    generating, with a fuel cell unit, electrical energy,
    storing, with a second battery, the electrical energy,
    actuating an electric machine (20) including windings (21, 22, 23) and an inverter,
    wherein the inverter (30) is formed as a 3-level inverter and has a plurality of electronic switches (S1, S2, S3, S4, S5, S6, S7, S8, S9, S10, S12) and diodes (D1, D2, D3, D4, D5, D6, X1, X2, X3, X4, X5, X6, X7, X8, X9, X10, X12) and a positive pole (37), a negative pole (35) and a neutral pole (36), wherein the fuel cell unit (12) and the secondary battery (14) are interconnected in series and are connected to the poles (35, 36, 37) of the inverter (30), and wherein the switches of the inverter are actuated in such a way that a short-circuit-like current path is produced between the poles of the inverter, to which poles the fuel cell unit is connected.

2. The method as claimed in claim 1, wherein the fuel cell unit (12) and the secondary battery (14) are connected to the poles (35, 36, 37) of the inverter (30) in such a way that a higher potential is applied to the positive pole (37) than to the neutral pole (36), and that a lower potential is applied to the negative pole (35) than to the neutral pole (36).

3. The method as claimed in claim 1, wherein a respective freewheeling diode (X1, X2, X3, X4, X5, X6, X7, X8, X9, X10, X12) is connected in parallel with the switches (S1, S2, S3, S4, S5, S6, S7, S8, S9, S10, S12), and in that clamping diodes (D1, D2, D3, D4, D5, D6) are provided between the switches (S1, S2, S3, S4, S5, S6, S7, S8, S9, S10, S12) and the neutral pole (36).

4. The method as claimed in claim 1, wherein the switches (S1, S2, S3, S4, S5, S6, S7, S8, S9, 510, S12) of the inverter (30) are actuated in such a way that only diodes (D1, D2, D3, D4, D5, D6, X1, X2, X3, X4, X5, X6, X7, X8, X9, X10, X12) and switches (S1, S2, S3, S4, S5, S6, S7, S8, S9, 510, S12) of the inverter (30) are located in the short-circuit-like current path.

5. The method as claimed in claim 4, wherein the switches (S1, S2, S3, S4, S5, S6, S7, S8, S9, S10, S12) of the inverter (30) are actuated in such a way that the short-circuit-like current path is produced and suppressed periodically.

6. The method as claimed in claim 1, wherein the switches (S1, S2, S3, S4, S5, S6, S7, S8, S9, S10, S12) of the inverter (30) are actuated in such a way that at least one winding (21, 22, 23) of the electric machine (20) is located in the short-circuit-like current path.

7. The method as claimed in claim 6, wherein the switches (S1, S2, S3, S4, S5, S6, S7, S8, S9, S10, S12) of the inverter (30) are actuated in such a way that the short-circuit-like current path is produced and suppressed periodically.

8. The method as claimed in claim 7, wherein a respective freewheeling diode (X1, X2, X3, X4, X5, X6, X7, X8, X9, X10, X12) is connected in parallel with each switch (S1, S2, S3, S4, S5, S6, S7, S8, S9, S10, S12) in such a way that an induction voltage, which is produced through suppressing the short-circuit-like current path in the winding (21, 22, 23) of the electric machine (20), generates a current, which flows to the secondary battery (14) via at least one freewheeling diode (X1, X2, X3, X4, X5, X6, X7, X8, X9, X10, X12).

9. A fuel cell vehicle (FCV) having a drive system (10) that comprises:

a fuel cell unit (12) for generating electrical energy, a secondary battery (14) for storing electrical energy, an electric machine (20) including windings (21, 22, 23), and an inverter (30) for actuating the electric machine (20), wherein the inverter (30) is formed as a 3-level inverter and has a plurality of electronic switches S1,(S2, S3, S4, S5, S6, S7, S8, S9, S10, S12) and diodes (D1, D2, D3, D4, D5, D6, X1, X2, X3, X4, X5, X6, X7, X8, X9, X10, X12) and a positive pole (37), a negative pole (35) and a neutral pole (36), wherein the fuel cell unit (12) and the secondary battery (14) are interconnected in series and are connected to the poles (35, 36, 37) of the inverter (30), and wherein the switches of the inverter are actuated in such a way that a short-circuit-like current path is produced between the poles of the inverter, to which poles the fuel cell unit is connected.

* * * * *